US006365892B1

(12) United States Patent
Cotter et al.

(10) Patent No.: US 6,365,892 B1
(45) Date of Patent: Apr. 2, 2002

(54) METHOD AND APPARATUS FOR CORRECTION OF INITIAL ION VELOCITY IN A REFLECTRON TIME-OF-FLIGHT MASS SPECTROMETER

(76) Inventors: Robert J. Cotter, 314 Overhill Rd., Baltimore, MD (US) 21210; Vladimir M. Doroshenko, 413 Valley Meadow Cir., Apt. A3, Reistertown, MD (US) 21136

( * ) Notice: Subject to any disclaimer, the term of this patent is extended or adjusted under 35 U.S.C. 154(b) by 0 days.

(21) Appl. No.: 09/199,108

(22) Filed: Nov. 24, 1998

Related U.S. Application Data

(60) Provisional application No. 60/066,513, filed on Nov. 24, 1997.

(51) Int. Cl.[7] .......................... B01D 59/44; H01J 49/00

(52) U.S. Cl. ....................................... 250/287; 250/282

(58) Field of Search ................................ 250/282, 287

(56) References Cited

U.S. PATENT DOCUMENTS 4,625,112 A 11/1986 Yoshida ...................... 250/287
5,160,840 A 11/1992 Vestal ........................ 250/287
5,464,985 A 11/1995 Cornish et al. ......... 250/396 R

FOREIGN PATENT DOCUMENTS

EP 0 704 879 A1 4/1996
WO WO 95/33279 12/1995
WO WO 98/01218 1/1998

OTHER PUBLICATIONS

Vlasak, Paul R., et al., "Method for the Design of Broad Energy Range Focusing Reflectrons," Journal of the American Society for Mass Spectrometry, vol. 7 No. 10, Oct. 1, 1996, pp. 1002–1008.

Cordero, Marcela M., et al., "Matrix–Assisted Laser Desorption/Ionization Tandem Reflectron Time–of–Flight Mass Spectrometry of Fullerenes," Journal of the American Society for Mass Spectrometry, vol. 7 No. 6, Jun. 1, 1996, pp. 590–597.

*Primary Examiner*—Bruce Anderson
(74) *Attorney, Agent, or Firm*—Pillsbury Winthrop LLP

(57) ABSTRACT

The present invention provides for a reflectron time-of-flight mass spectrometer in which there exists a curved field in a portion of the reflectron that takes into account acceleration and deceleration fields in upstream (from the ion source down to the reflectron) and downstream (from the reflectron down to the ion detector) regions, which are always present in any TOF-MS. The reflectron includes a decelerating section and a correcting section, with curved electric fields in the correcting and/or decelerating sections of the reflectron being considered. Moreover, analytic expressions are provided for calculating the profiles of the curved electric field in the second (correcting) section of the reflectron, which expressions are valid for arbitrary electric field distributions in the upstream and downstream regions as well as in the first (deceleration) section of the reflectron. These profiles will depend on the electric field distributions in the upstream and downstream regions and in the first (deceleration) section of the reflectron.

21 Claims, 9 Drawing Sheets

METHOD AND APPARATUS FOR CORRECTION OF INITIAL ION VELOCITY IN A REFLECTRON TIME-OF-FLIGHT MASS SPECTROMETER

This application claims benefit of provisional application No. 60/066,515, filed Nov. 24, 1997.

BACKGROUND OF THE INVENTION

1. Field of the Invention

The present invention relates to the method of mass analysis using the time-of-flight (TOF) mass spectrometry and, more specifically, it relates to TOF mass spectrometry in which a reflectron is used for correction of the initial ion velocity distribution in an ion source, and, most specifically, it relates to the method of designing a reflectron for a TOF mass spectrometer which takes into account the effect of presence of acceleration and deceleration regions in the ion source, ion detector, and other ion optics elements of the TOF mass spectrometer on the correction of the initial ion velocity distribution. The invention also relates to an improved mass spectrometer design and, more specifically, it relates to such a design for achieving high mass resolution in the matrix-assisted laser desorption/ionization (MALDI) TOF mass spectrometer, and, most specifically, it relates to the design of a high resolution MALDI/TOF mass spectrometer using low voltages for extraction of ions from an ion source.

2. Description of the Related Art

The time-of-flight (TOF) mass spectrometer (MS) is a well known instrument for mass analysis in which ions formed from sample molecules in an ion source are accelerated to the same energy and allowed to drift along some path before detection. Because ions of different mass have different velocity after acceleration they are separated in space during flight and in time during detection, thus, the time of arrival to the detector is measure of mass (or mass-to-charge ratio m/z if ions are not singly-charged). However, such a simple picture is always complicated by the presence of non-ideal factors and among them are: (a) different time of formation or acceleration of ions; (b) different initial location of ions in space; and (c) different initial velocity of ions before acceleration, as described in Cotter, R. J. Time-of-Flight Mass Spectrometry: Instrumentation and Applications in Biological Research, ACS Professional Reference Books: Washington, 1997; p. 326. However, time focusing can be achieved by using pulsed drawout fields with sharp rise times or short laser pulses in the case of laser desorption (LD) or matrix-assisted laser desorption/ionization (MALDI). A dual-stage extraction method is normally used for correction of the initial spatial distribution of ions in an ion source, as described in Wiley, W. C.; McLaren, I. H. Rev. Sci. Instr. 1955, 26, 1150–1157. And finally, initial velocity (or energy) distribution can be corrected by time-lag focusing technique, which is now also referred to as a pulsed or delayed or time-delayed extraction method. See, for example, Wiley, W. C.; McLaren, I. H. Rev. Sci. Instr. 1955, 26, 1150–1157; Van Breemen, R. B.; Snow, M.; Cotter, R. J. Int. J. Mass Spectrom. Ion Phys. 1983, 49, 35–50; Colby, S. M.; King, T. B.; Reilly, J. P. Rapid Commun. Mass Spectrom. 1994, 8, 865–868; Brown, R. S.; Lennon, J. J. Anal. Chem. 1995, 67, 1998–2003 and Vestal, M. L.; Juhasz, P.; Martin, S. A. Rapid Commun. Mass Spectrom. 1995, 9, 1044–1050.

In the method of mass analyzing and the design of the mass spectrometer which constitute the subject of this patent, the compensation for the effect of initial velocity distribution of ions is of primary concern, which concern is primarily driven by the wide use of MALDI and LD-TOF instruments. Since MALDI and LD ions are desorbed from or formed near a well defined smoothed equipotential surface, the initial spatial distribution of ions is minimized. Initial temporal distribution for ions is also very small due to the use of short pulse lasers (the pulse width of a nitrogen laser is usually less than 1 ns). Thus, in the case of MALDI and LD broadening of the mass spectral lines by the initial velocity distribution is of primary concern. MALDI ions, for example, are desorbed with mean velocities up to hundreds of meters per second, which depend primarily on the matrix, and the energy of desorbed ions may easily reach 10–100 eV depending on ion mass. See, for example, Spengler, B.; Cotter, R. J. Anal. Chem. 1990, 62, 793–796; Ens, W.; Mao, Y.; Mayer, F.; Standing, K. G. Rapid Commun. Mass Spectrom. 1991, 5, 117–123; Huth-Fehre, T.; Becker, C. H. Rapid Commun. Mass Spectrom. 1991, 5, 378–382; Beavis, R. C.; Chait, B. T. Chem. Phys. Lett. 1991, 181, 479–484; Pan, Y.; Cotter, R. J. Org. Mass Spectrom. 1992, 27, 3–8; Zhou, J.; and Ens, W.; Standing, K. G.; Verentchikov, A. Rapid Commun. Mass Spectrom. 1992, 6, 671–678.

The major drawback of the time-delayed extraction method used for the initial velocity distribution correction is its mass dependence, which is very impractical for a TOF mass spectrometer recording the entire mass range. A number of investigators are working on improvements of the time-delayed extraction technique and other methods using dynamic electric fields, such as Marable, N. L.; Sanzone, G. Int. J. Mass Spectrom. Ion Phys. 1974, 13, 185–194; Browder, J. A.; Miller, R. L.; Thomas, W. A.; Sanzone, G. Int. J. Mass Spectrom. Ion Phys. 1981, 37, 99–108; Muga, M. L. Anal. Instrum. 1987, 16, 31–50; Yefchak, G. E.; Enke, C. G.; Holland, J. F. Int. J. Mass Spectrom. Ion Processes 1987, 87, 313–330; Kinsel, G. R.; Johnston, M. V. Int. J. Mass Spectrom. Ion Processes 1989, 91, 157–176; Kinsel, G. R.; Grundwuermer, J. M.; Grotemeyer, J. J. Am. Soc. Mass Spectrom. 1993, 4, 2–10; Kovtoun, S. V. Rapid Commun. Mass Spectrom. 1997, 11, 433–436; and Kovtoun, S. V. Rapid Commun. Mass Spectrom. 1997, 11, 810–815. The problem of mass dependence in the case of using pulsed extraction fields, however, is not yet fully resolved.

Alternatively, an approach to mass independent correction of the initial velocity distribution of ions has been possible with the invention of the ion mirror or the reflectron, described in Mamyrin, B. A.; Karataev, V. I.; Shmikk, D. V.; Zagulin, V. A. Sov. Phys. JETP 1973, 37, 45–48. A reflectron does not actually make any correction of the initial spatial, temporal or velocity distributions but effectively extends the ion flight path, thus, increasing the mass resolution. It simply transfers the temporal and spatial distributions at the start (or focal) plane to the final focal plane formed after reflecting the ions by the ion mirror. As for the initial velocity distribution it is also transferred by the reflectron from the start space focal plane to the final focal plane but with some distortion. The accuracy of the velocity distribution transfer by the reflectron is usually expressed by the order of focusing which is actually the power of the highest zero term in the expansion of the ion time-of-flight over the initial ion velocity. For example, a single-stage linear reflectron performs the first order velocity focusing while a two-stage linear reflectron can focus with the second order accuracy. A parabol ic mirror can perform infinite order focusing, i.e. the ion time-of-flight does not depend on the initial kinetic energy of ions at all, as described in U.S. Pat. No. 4,625,112 to Yoshida. Such mirrors are also referred to as ideal reflectrons. A field inside a parabolic reflectron is curved and according to the LaPlace equation it also has a curvature in a radial (or transverse) direction. This, of course, results in limitations for an angular aperture of such reflectron. Small divergent properties of a parabolic reflectron can also affect the kinetic energy of ions and, thus, the mass resolution. Another feature of a parabolic reflectron, which does not encourage its wide use, is the absence of a field-free region which is always required in TOF/MS for mounting detectors, lenses, energy filters, etc. This drawback is overcome in another design for an ideal reflectron in which a curved field is also used inside the reflectron but the field-free path can be made of any length in comparison with the reflectron length if the minimum initial energy of ions to be focused is allowed to be larger than zero (a parabolic reflectron focuses ions of all energies starting from zero), described by Managadze, G. G.; Shutyaev, I. Yu. In Laser Ionization Mass Spectrometry; Vertes, A.; Gijbels, R.; Adams, F., Eds.; John Wiley & Sons: New York, 1993; p. 505–549. With that design, the most general solution for the field inside an ideal reflectron was obtained. The solutions for some special cases have also been reported using analytical and numerical approaches, described, respectively, in Flory, C. A.; Taber, R. C.; Yefchak, G. E. Int. J. Mass Spectrom. Ion Processes 1996, 152, 177–184 and Vlasak, P.; Beussman, D. J.; Ji, Q.; Enke, C. G. J. Am. Soc. Mass Spectrom. 1996, 7, 1002–1008. A curved-field of special design has been also used in the second reflectron of a tandem MALDI/TOF/TOF instrument for focusing product ions having different kinetic energy after the fragmentation of precursor ions in collisions with target neutral molecules, as described in U.S. Pat. No. 5,464,985 to Cornish, T. J. and Cotter, R. J.

Thus, with the introduction of a reflectron the problem of velocity focusing is reduced to obtaining good conditions at the start focal plane. This is not a problem if the initial spatial distribution in the ion source is the major source of the line broadening in mass spectra because any single or double-stage extraction scheme effectively eliminates the ion space distribution (converting it into the larger velocity distribution of ions at the focal plane). In the case of MALDI where the major contribution into the line broadening comes from the initial velocity distribution of ions the situation is not so clear. It has been shown that velocity focusing cannot be achieved at all in a MALDI/TOF-MS with a single-stage linear reflectron, such as illustrated in FIG. 1A, and the corresponding kinetic energy distribution of injected ions being shown in FIG. 1B. As illustrated and is known, such a single stage reflectron contains an ion source 12, a drawout assembly 14, a reflectron 16 that contains a grid 18, and a detector 20. The same is true when a two-stage linear reflectron is used, such as illustrated in FIG. 2A, which contains essentially the same physical components as the single stage reflectron of FIG. 1A, with a difference being that the reflectron 16 contains two stages, 16A and 16B, to which are applied different voltages V1 and V2 that cause ions to lose their kinetic energy according to the distribution illustrated by FIG. 2B. The use of very high acceleration voltages facilitates but does not solve the problem completely. The problem of velocity focusing in a TOF/MS can be partially solved with specially designed double-stage reflectron 16, such as illustrated in FIG. 3A and the corresponding distribution illustrated in FIG. 3B, or three-stage linear reflectrons that includes stages 16A, 16B and 16C to which are applied voltages V1, V2 and V3, such as illustrated in FIG. 4A and the corresponding distribution illustrated in FIG. 4B, but the accuracy of the velocity focusing is limited by the first and second order correspondingly, as described by Short, R. T., Todd, P. J. J. Am. Soc. Mass Spectrom. 1994, 5, 779–787 and U.S. Pat. No. 5,160,840 to Vestal.

SUMMARY OF THE INVENTION

It is an object of the present invention to provide an improved method for focusing the initial ion velocities in a TOF mass spectrometer and, thus, to achieve higher mass resolution of the instrument. Better focusing also allows one to decrease the voltage used for extraction of ions from an ion source that results in smaller size of the instrument.

It is also an object of the present invention to solve the problem of an ideal (or infinite order) velocity focusing in a reflectron TOP mass spectrometer using a curved electric field inside a reflectron.

In the present invention, in addition to the field-free region, the curved field in the reflectron takes into account also acceleration and deceleration fields in upstream (from the ion source down to the reflectron) and downstream (from the reflectron down to the ion detector) regions, which are always present in any TOF-MS. The reflectron includes a decelerating section and a correcting section, with curved electric fields in the correcting and/or decelerating sections of the reflectron being considered. Moreover, analytic expressions are provided for calculating the profiles of the curved electric field in the second (correcting) section of the reflectron, which expressions are valid for arbitrary electric field distributions in the upstream and downstream regions as well as in the first (deceleration) section of the reflectron. These profiles will depend on the electric field distributions in the upstream and downstream regions and in the first (deceleration) section of the reflectron.

The use of the curved field results in ideal (infinite order) focusing, in contrast to the limited (first or second) order focussing that is conventionally used. Additionally, the curved field in the present invention can be designed for any geometry of the upstream and downstream regions and the decelerating section of the reflectron, in contrast to the precise adjustment of the lengths of all regions to achieve focusing as has been previously required.

The present invention also provides an improved apparatus for focusing the initial ion velocities in a reflectron TOF mass spectrometer that consists of a two-stage reflectron with a curved profile for the electric field in the second (correcting) section of the reflectron. The profile of the electric field in the first (decelerating) section of the reflectron can be chosen arbitrarily. The profile in the second section depends on the electric fields in other sections of the TOF mass spectrometer. The two sections of the reflectron can be separated by a grid, or a gridless design can be utilized.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout several views and wherein.

DETAILED DESCRIPTION OF THE PREFERRED EMBODIMENTS

Figure 1A:
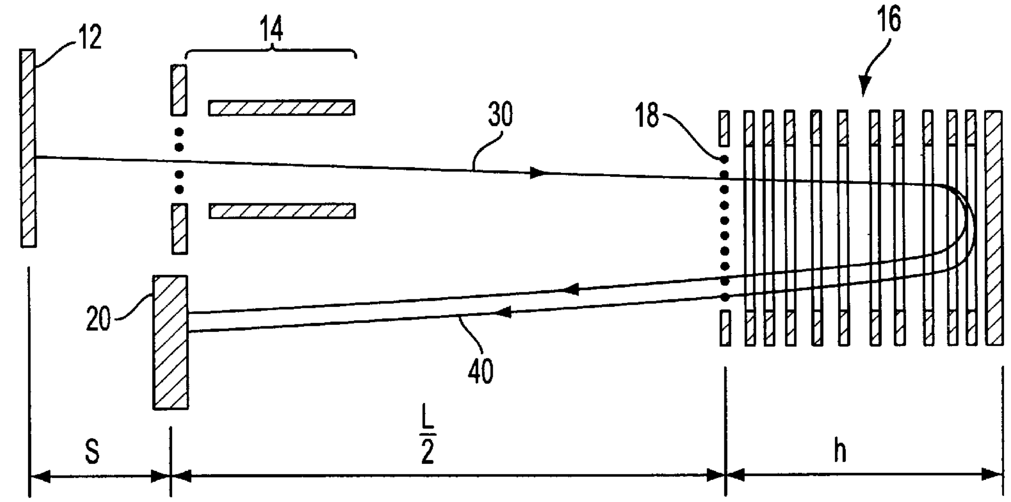
FIG. 1A (PRIOR ART)
FIG. 1 illustrates a simplified diagram of a conventional TOF mass spectrometer with the single-stage linear reflectron and the ion potential energy in it.
Figure 1B:
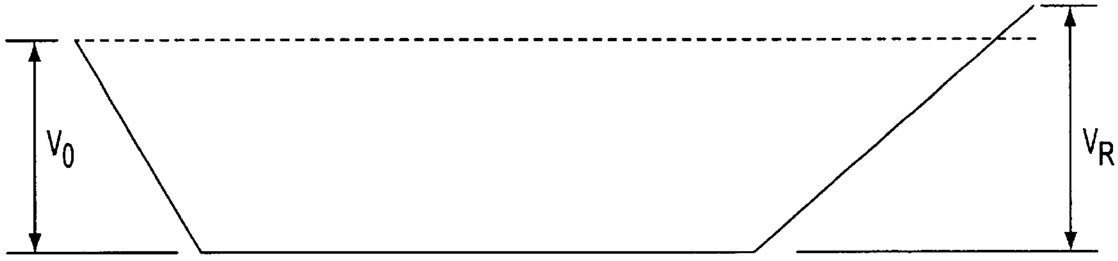
FIG. 1B (PRIOR ART)
Figure 2A:
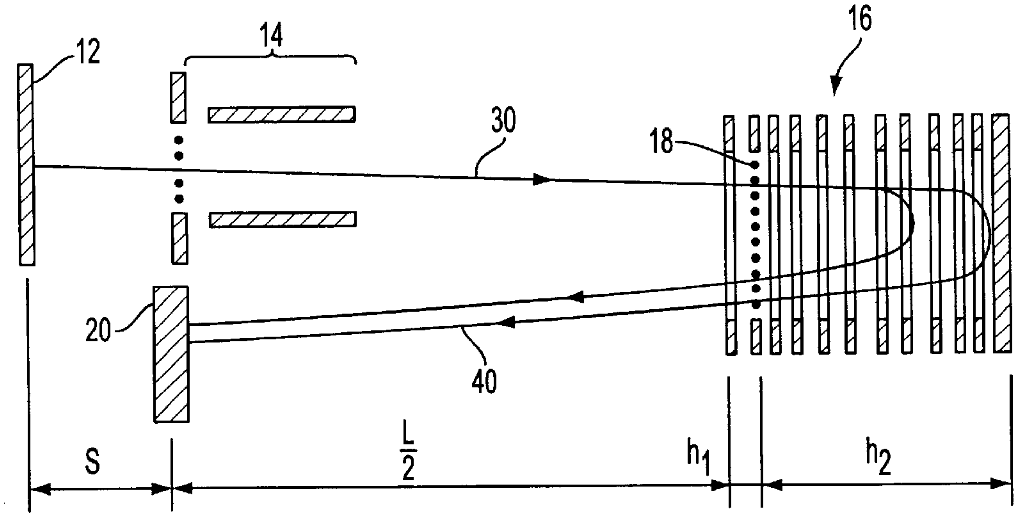
FIG. 2A (PRIOR ART)
FIG. 2 illustrates a simplified diagram of a conventional TOF mass spectrometer with the double-stage linear reflectron and the ion potential energy in it.
Figure 2B:
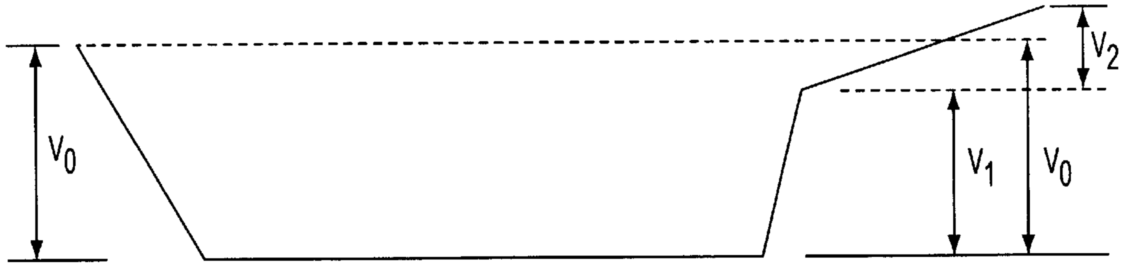
FIG. 2B (PRIOR ART)
Figure 3A:
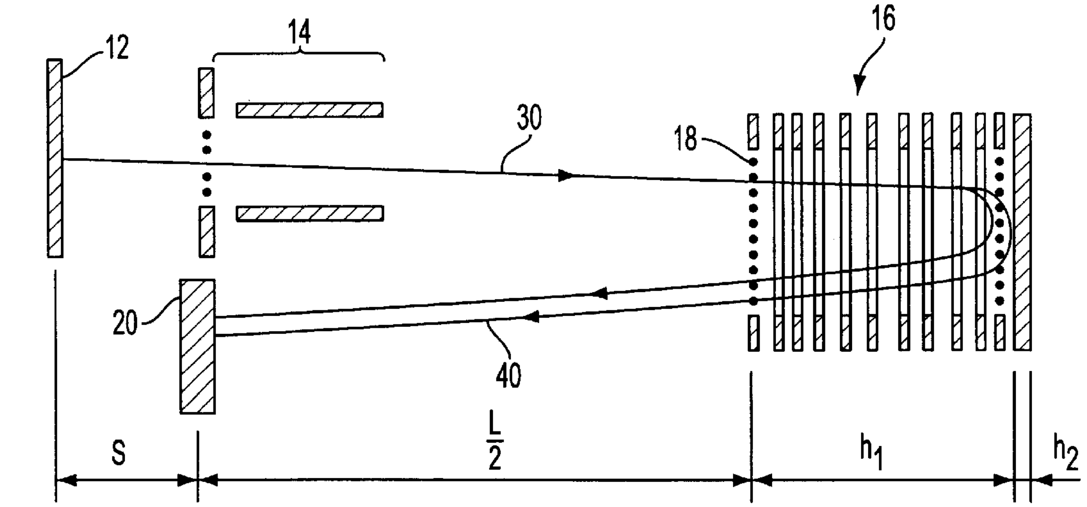
FIG. 3A (PRIOR ART)
FIG. 3 illustrates a simplified diagram of a conventional TOF mass spectrometer with the double-stage linear reflectron designed for the correction of the acceleration region in the ion source, and the ion potential energy in it.
Figure 3B:
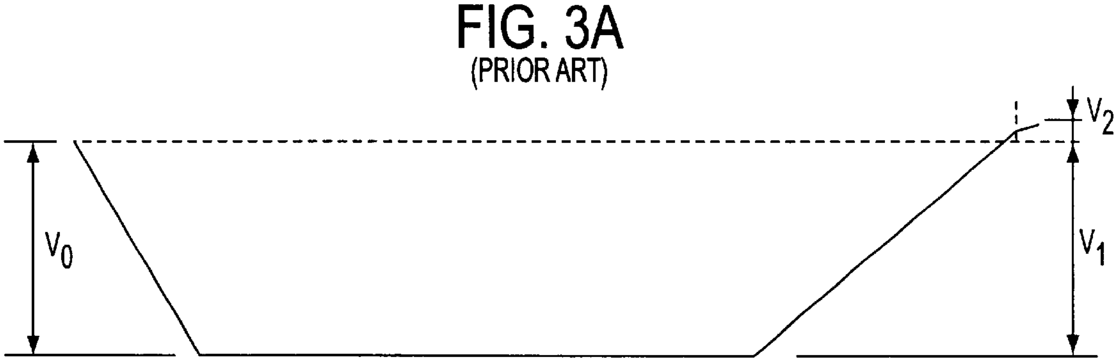
FIG. 3B (PRIOR ART)
Figure 4A:
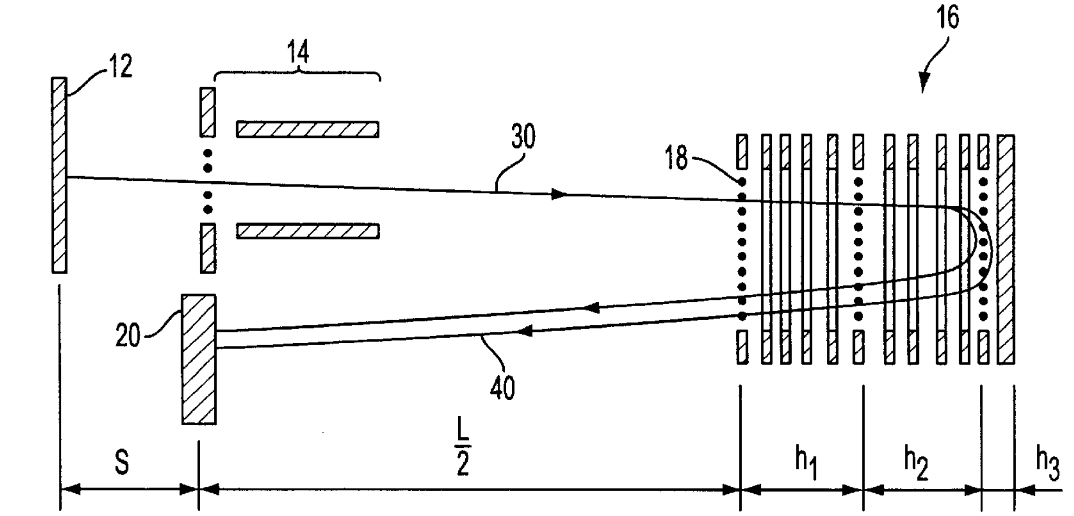
FIG. 4A (PRIOR ART)
FIG. 4 illustrates a simplified diagram of a conventional TOF mass spectrometer with the three-stage linear reflectron designed for the correction of the acceleration region in the ion source, and the ion potential energy in it.
Figure 4B:
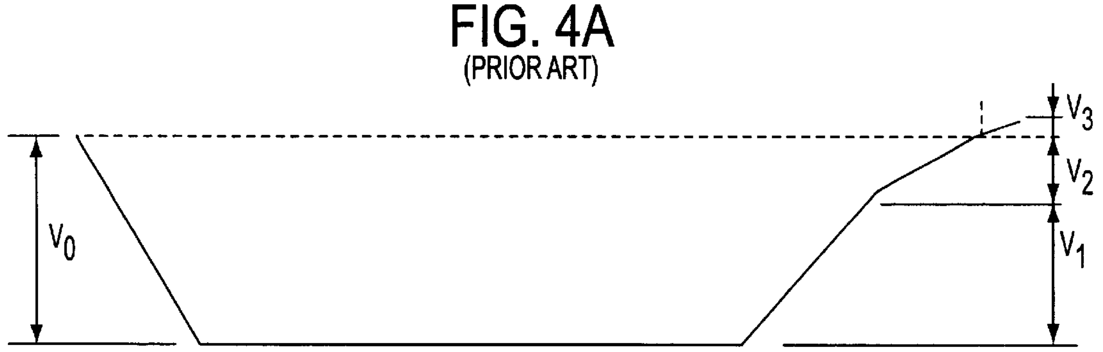
FIG. 4B (PRIOR ART)
Figure 5:
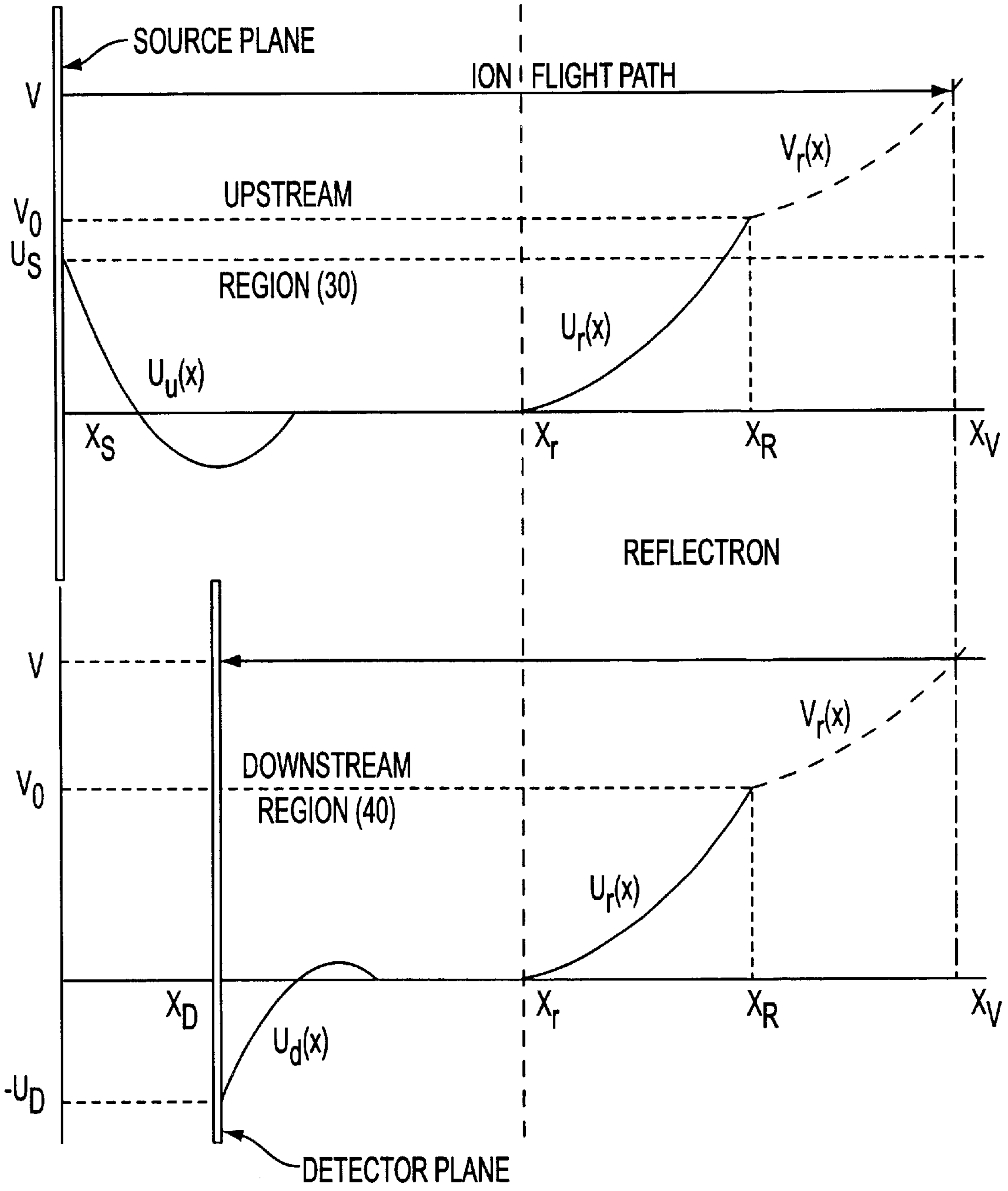
FIG. 5 illustrates the ion potential energy during an ion flight from an ion source to a detector via the upstream region, the reflectron, and the downstream region of a TOF/MS.

The present invention solves the problem of ideal velocity focusing of ions for the whole TOF/MS system which may include ion source acceleration regions, a field-free region, a reflectron, energy discrimination filters, ion lenses, post-source acceleration before an ion detection, etc. The task is formulated in a one-dimensional approximation for the most general case, i.e. for ions initially formed at the start plane in an ion source with full (kinetic plus potential) energy within an interval from $V_0$ to V, to determine a field inside the reflectron which would perform the infinite order velocity focusing at the detector plane. The ion potential energy $U_u(x)$ due to the electric field in the upstream (from the ion source down to the reflectron) region can be different from that $U_d(x)$ in the downstream (from the reflectron down to an ion detector) region as shown in FIG. 5. For simplicity the potential at the entry to the reflectron is taken as a reference point equal to zero. In addition to the upstream and downstream regions the potential $U_r(x)$ inside the reflectron from zero up to $V_0$ can also be arbitrary. Thus, the potential field $V_r(x)$ from $V_0$ to V shown by the dashed line in FIG. 5 is to be found. Note that the situation is quite different from that when only linear fields inside TOF/MS are considered, as was done by Short, R. T.; Todd, P. J. J. Am. Soc. Mass Spectrom. 1994, 5, 779–787 and Vestal, M. L. U.S. Pat. No. 5,160,840 (hereinafter referred to as "Short and Vestal"). In the latter case the field inside the reflectron and the upstream (and/or downstream) region should be determined to achieve first (or higher) velocity order focusing. With reference to FIGS. 1–6, the upstream region 30 and the downstream region 40 are correspondingly identified.

According to the present invention, the infinite order velocity conditions are determined for the arbitrary potential fields $U_u(x)$ and $U_d(x)$ in the upstream and downstream regions and even for the arbitrary field $U_r(x)$ in the decelerating section of the reflectron. This becomes possible because the potential field $V_r(x)$ which is to be found can be curved. This, of course, does not preclude optimizing the fields $U_u(x)$, $U_r(x)$ and $U_d(x)$. As can be shown these fields can be chosen to facilitate the solution of other tasks such as tuning and constructing the reflectron.

The total time-of-flight t for an ion of mass m and the full energy ϵ within the interval from $V_0$ to V can be written as $$\bar{t} = \int_{x_S}^{x_r} \frac{dx}{\sqrt{\varepsilon - U_u(x)}} + \int_{x_D}^{x_r} \frac{dx}{\sqrt{\varepsilon - U_d(x)}} + 2\int_{x_r}^{x_R} \frac{dx}{\sqrt{\varepsilon - U_r(x)}} + 2\int_{x_R}^{x_V} \frac{dx}{\sqrt{\varepsilon - V_r(x)}} \tag{1}$$

where $\bar{t}=t\sqrt{2/m}$ is a reduced time-of-flight. The first and the second terms of the right side of this equation are the times-of-flight for the upstream and downstream regions correspondingly, the third and the forth terms correspond to the flight forward and back through the reflectron.

In the case of linear fields in a reflectron TOF/MS of Short and Vestal, the formula (1) for the time-of-flight is normally expressed as a series expansion over the initial ion velocity $v_S=\sqrt{2(\epsilon-U_S)/m}$ where $U_S$ is the initial potential energy of the ion (see FIG. 5 for geometry definition) and, then, the parameters of the linear electric fields are tuned to make the expansion terms responsible for the first (or higher) order velocity focusing equal to zero. According to the present invention, the time t does not depend upon the ion initial energy within the interval from $V_0$ to V and the function $V_r(x)$ should be found by solving the integral equation (1).

Solution of the integral equation for the general case. After multiplying both sides of the equation (1) by $1/2\pi\sqrt{V-\epsilon}$ and integrating over ϵ from $V_0$ to V one can obtain:

$$\Delta x_V = 1/\pi\bar{t}(V_0\bar{V})^{1/2} - I_u - I_d - 2I_r \tag{2}$$

where $\bar{V}=(V-V_0)/V_0$ is a dimensionless potential in the second section of the reflectron;

$$\begin{aligned} \Delta x_V &= \frac{1}{\pi}\int_{V_0}^{V} d\varepsilon \int_{x_R}^{x_V} \frac{dx}{\sqrt{(V-\varepsilon)[\varepsilon - V_r(x)]}} \\ &= \frac{1}{\pi}\int_{x_R}^{x_V} dx \int_{V_r(x)}^{V} \frac{d\varepsilon}{\sqrt{(V-\varepsilon)[\varepsilon - V_r(x)]}} \\ &\left( = \frac{1}{\pi}\int_{x_R}^{x_V} dx\left[-\arctan\left(\frac{V-2\varepsilon+V_r(x)}{2\sqrt{(V-\varepsilon)[\varepsilon-V_r(x)]}}\right)\right]\Bigg|_{V_r(x)}^{V} \right) \\ &= x_V - x_R \end{aligned} \tag{3}$$

where for arbitrary function f(ϵ) we defined $f(\epsilon)|_b^a=f(a)-f(b)$;

$$\begin{aligned} I_a &= \frac{1}{2\pi}\int_{V_0}^{V} d\varepsilon \int_{x_a}^{x_A} \frac{dx}{\sqrt{(V-\varepsilon)[\varepsilon - U_a(x)]}} \\ &= \frac{1}{2\pi}\int_{x_a}^{x_A} dx \int_{V_0}^{V} \frac{d\varepsilon}{\sqrt{(V-\varepsilon)[\varepsilon - U_a(x)]}} \\ &\left( = \frac{1}{2\pi}\int_{x_a}^{x_A} dx\left[-\arctan\left(\frac{V-2\varepsilon+U_a(x)}{2\sqrt{(V-\varepsilon)[\varepsilon-U_a(x)]}}\right)\right]\Bigg|_{V_0}^{V} \right) \\ &= \frac{1}{\pi}\int_{x_a}^{x_A} dx \arctan\sqrt{\frac{\bar{V}}{\bar{U}_a(x)}} \end{aligned} \tag{4}$$

where $\bar{U}_a=[V_0-U_a(x)]/V_0$; a=u,d, or r; $x_a$ and $x_A$ are the limits of the action of the corresponding potential, e.g. $(x_a,x_A)=(x_S,x_r)$ and $(x_a,x_A)=(x_D,x_r)$ for the cases a=u and d correspondingly.

Equation (2) determines the coordinate $x_V$ at which the potential in the correcting section of the reflectron is equal to V, i.e. it determines in reciprocal fashion the function $V=V_r(x)$.

Note that $\bar{t}$ in the equation (2) is an arbitrary parameter. Limits for this parameter will be discussed later. Let us designate $$\bar{t}_0 = \int_{x_S}^{x_r} \frac{dx}{\sqrt{V_0 - U_u(x)}} + \int_{x_D}^{x_r} \frac{dx}{\sqrt{V_0 - U_d(x)}} + 2\int_{x_r}^{x_R} \frac{dx}{\sqrt{V_0 - U_r(x)}} \quad (5)$$

Then, the solution (2) can be rewritten as $$\Delta x_V = \frac{(\bar{t} - \bar{t}_0)V_0^{1/2}}{\pi} \bar{V}^{1/2} - I'_u - I'_d - 2I'_r \quad (6)$$

where $$I'_a = \frac{1}{\pi}\int_{x_a}^{x_A} dx\left[\arctan\sqrt{\frac{\bar{V}}{\bar{U}_a(x)}} - \sqrt{\frac{\bar{V}}{\bar{U}_a(x)}}\right] \quad (7)$$

Properties of the general solution in the case $V_0 \neq U_S$. Let us consider the behavior of the solution (6) near the point $x=x_R$. Although this is not absolutely necessary for this analysis, we assume (and this is true for the majority of the practical cases) that the function $\bar{U}_a(x)$ is not equal to zero except the point $x_R$ and may be the start point in the ion source $x_S$. The latter is possible only in the case $V_0=U_S$ and is considered below.

In the vicinity of $x=x_R$ we may take into account only linear dependence of the function $\bar{U}_r(x)=\bar{U}'(x_R-x)/\Delta x_R$ where $\bar{U}'<<1$, $\Delta x_R<<1$. The integral (7) in the case a=r can be presented as $$I'_r = I''_r + I'''_r \quad (8)$$

where $$I''_r = \frac{1}{\pi}\int_{x_r}^{x_R-\Delta x_R} dx\left[\arctan\sqrt{\frac{\bar{V}}{\bar{U}_r(x)}} - \sqrt{\frac{\bar{V}}{\bar{U}_r(x)}}\right] \quad (9)$$

$$\begin{aligned} I'''_r &= \frac{1}{\pi}\int_{x_R-\Delta x_R}^{x_R} dx\left[\arctan\sqrt{\frac{\bar{V}}{\bar{U}_r(x)}} - \sqrt{\frac{\bar{V}}{\bar{U}_r(x)}}\right] \quad (10) \\ &= \frac{\Delta x_R V'^{1/V'}}{\pi}\int_0^{1/V'} dv\left[\arctan\sqrt{\frac{1}{v}} - \sqrt{\frac{1}{v}}\right] \\ &= \frac{\Delta x_R}{\pi}\left[\arctan\sqrt{V'} - \sqrt{V'} - \frac{\pi V'}{2} + V'\arctan\sqrt{V'}\right] \end{aligned}$$

where $V'=\bar{V}/\bar{U}'$. For small V' one can expand the expression (10) in series:

$$I'''_r = \frac{\Delta x_R}{\pi}\left[-\frac{\pi V'}{2} + \frac{2}{3}V'^{3/2} + \dots\right] \quad (11)$$

In the cases a=u and d and $\bar{V}<<0$ the expression under the integral (7) can also be expanded in series that results in $$I'_a = \frac{1}{\pi}\int_{x_a}^{x_A} dx\left[-\frac{1}{3}\left(\frac{\bar{V}}{\bar{U}_a(x)}\right)^{3/2} + \frac{1}{5}\left(\frac{\bar{V}}{\bar{U}_a(x)}\right)^{5/2} - \dots\right] \quad (12)$$

After integration the integral (12) contains only the terms proportional to $\bar{V}^{3/2}$, $\bar{V}^{5/2}$, and higher order terms. A similar expression (with different integration limits) can be obtained for the integral (9). Thus, the integrals (12) and (9) do not contain low order terms with $\bar{V}^{1/2}$ and $\bar{V}$. The only low order term in the integral (6) is from the expression (11) and the final result for the case $\bar{t}=\bar{t}_0$ can be written as $$\Delta x_V = \Delta x_R V' + aV'^{3/2} + bV'^{5/2} + \dots \quad (13)$$

where a and b are some coefficients. One can see that the electric field in the second section of the reflectron is linear near the point $x=x_R$ and $$E_V = E_r \quad (14)$$

where $E_V$ and $E_r$ are the absolute values for the electric field strength near the point $x=x_R$ in the second (correcting) and first (decelerating) sections of the reflectron respectively.

Properties of the general solution in the case $U_S=V_0$. In this case the integral $I'_u$ also makes a contribution to the low order terms in the solution (6). The expression for the integral $I'_u$ can be calculated similarly to $I'_r$ by taking into account only the linear section of the function $\bar{U}_u(x)=\bar{U}'(x-x_S)/\Delta x_S$ near the point $x=x_S$:

$$I'_u = I''_u + I'''_u \quad (15)$$

where $$I''_u = \frac{1}{\pi}\int_{x_S+\Delta x_S}^{x_r} dx\left[\arctan\sqrt{\frac{\bar{V}}{\bar{U}_u(x)}} - \sqrt{\frac{\bar{V}}{\bar{U}_u(x)}}\right] \quad (16)$$

$$\begin{aligned} I'''_u &= \frac{1}{\pi}\int_{x_S}^{x_S+\Delta x_S} dx\left[\arctan\sqrt{\frac{\bar{V}}{\bar{U}_u(x)}} - \sqrt{\frac{\bar{V}}{\bar{U}_u(x)}}\right] \quad (17) \\ &= \frac{\Delta x_S}{\pi}\left[\arctan\sqrt{V'} - \sqrt{V'} - \frac{\pi V'}{2} + V'\arctan\sqrt{V'}\right] \\ &= \frac{\Delta x_S}{\pi}\left[-\frac{\pi V'}{2} + \frac{2}{3}V'^{3/2} + \dots\right] \end{aligned}$$

Because, similar to the integral (12), the integrals $I''_u$, $I''_r$ and $I'_d$ in the solution (6) do not contain low order terms with $\bar{V}^{1/2}$ and $\bar{V}$, the integrals (10) and (17) only generate low order terms. Similar to expression (13) one can obtain for the case $\bar{t}=\bar{t}_0$:

$$\Delta x_V = \left(\frac{1}{2}\Delta x_S + \Delta x_R\right)V' + aV'^{3/2} + bV'^{5/2} + \dots \quad (18)$$

that results in the following relation between electric field strengths:

$$\frac{1}{E_V} = \frac{1}{2E_s} + \frac{1}{E_r} \quad (19)$$

where $E_s$ is the absolute value of the electric field strength near the start plane in the source region ($x=x_S$). Formula (19) can be considered as a generalization of the result obtained for the case of linear electric fields of Short, R. T.; Todd, P. J. J. Am. Soc. Mass Spectrom. 1994, 5, 779–787. Thus, the electric field potential near $x=x_R$ in the reflectron always has a casp if ions of all velocities (starting from zero) in the ion source are to be focused.

Limits for the parameter $\bar{t}$. As mentioned previously the parameter $\bar{t}$ is an arbitrary parameter in this method. If the ion full energy $\epsilon$ in the equation (1) is equal to $V_0(\epsilon=V_0)$ then two cases may occur: (a) the last term in the right side of equation (1) is equal to zero; or (b) the last term is not equal to zero. In the latter case (b) $\bar{t}$ must be larger than $\bar{t}_0$ because otherwise $\Delta x_V$ in the solution (6) can become negative and the potential inside the reflectron is ambiguous. The situation in case (b) is very similar to that of a parabolic mirror in which the time-of-flight is a finite value (greater than zero) even for zero entrance energy, as shown by U.S. Pat. No. 4,625,112 to Yoshida. This results in terms proportional to $(\overline{V})^{1/2}$ in the solutions (2) or (6). In the case (a) $\bar{t}=\bar{t}_0$ and the terms proportional to $(\overline{V})^{1/2}$ are not present in the solutions (2) and (6) as it follows from our previous results (8)–(13) and (15)–(18). One can obtain, similar to expression (18), an expansion valid near the point $x=x_R$:

$$\Delta x_V = \frac{(\bar{t}-\bar{t}_0)V_0^{1/2}}{\pi}\overline{V}^{1/2} + \Delta x\overline{V} + A\overline{V}^{3/2} + B\overline{V}^{5/2} + \dots \tag{20}$$

where Δx, A, B, etc. are the expansion coefficients.

Thus, only the values of $\bar{t}\geqq\bar{t}_0$ are allowed and the quadratic term is always present in the correcting section $V_r(x)$ of the reflectron if $\bar{t}>\bar{t}_0$. The choice $\bar{t}=\bar{t}_0$ is the only opportunity to avoid the quadratic term in the correcting section of the reflectron. Quadratic fields are practically difficult to design while there are no major problems for generating a linear field near $x=x_R$ in the case $\bar{t}=\bar{t}_0$.

Low acceleration voltage case. The acceleration voltage can be comparable with the energy of ions formed in an ion source especially in the case of high mass MALDI ions (See Spengler, B.; Cotter, R. J. Anal. Chem. 1990, 62, 793–796; Ens, W.; Mao, Y.; Mayer, F.; Standing, K. G. Rapid Commun. Mass Spectrom. 1991, 5, 117–123; Huth-Fehre, T.; Becker, C. H. Rapid Commun. Mass Spectrom. 1991, 5, 378–382; Beavis, R. C.; Chait, B. T. Chem. Phys. Lett. 1991, 181, 479–484; Pan, Y.; Cotter, R. J. Org. Mass Spectrom. 1992, 27, 3–8; and Zhou, J.; Ens, W.; Standing, K. G.; Verentchikov, A. Rapid Commun. Mass Spectrom. 1992, 6, 671–678) and a double-stage extraction scheme used. This is the case that is most suitable for applying the method because linear fields inside the reflectron do not provide the necessary accuracy for the velocity focusing or do not focus at all.

Figure 6:
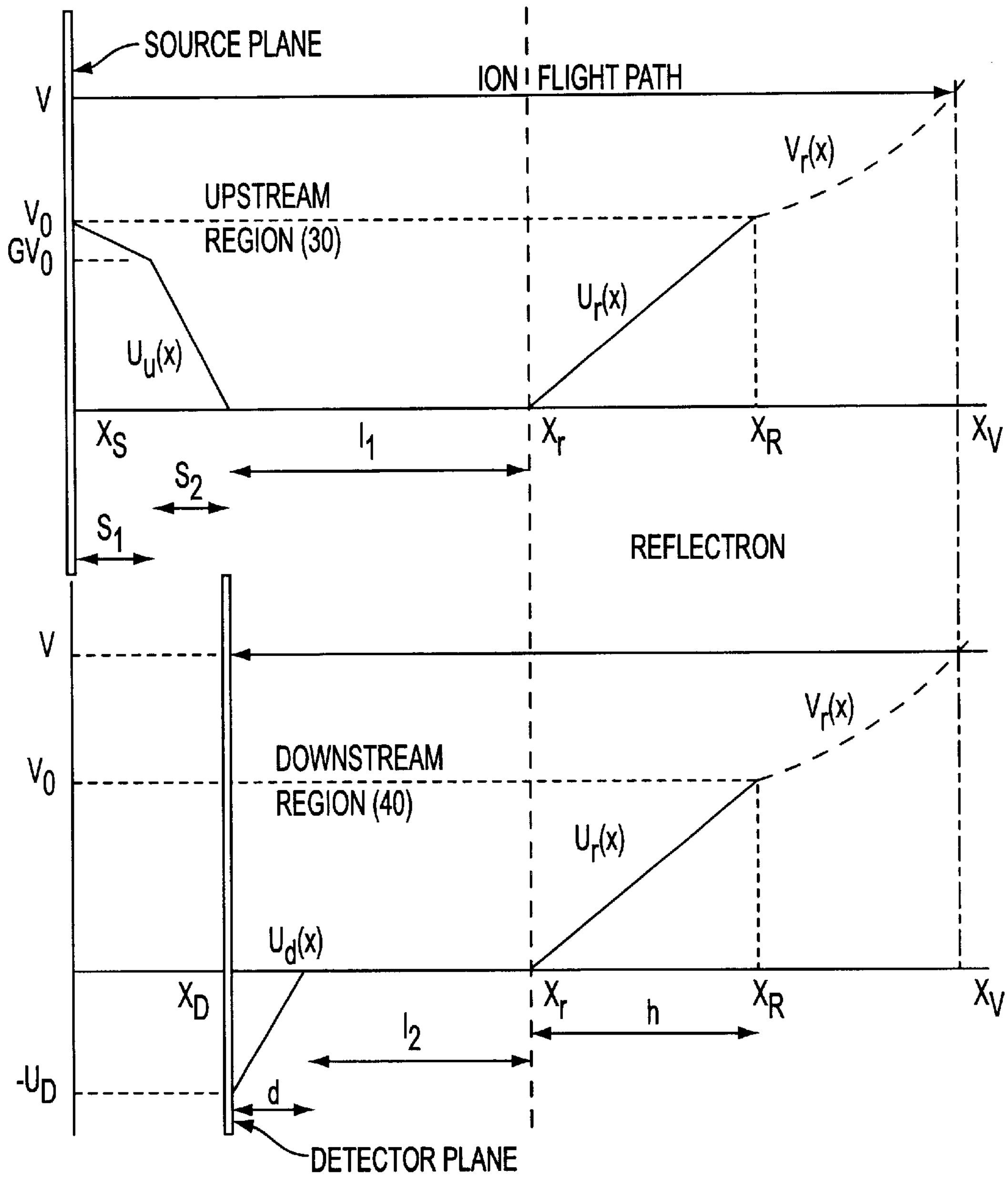
FIG. 6 illustrates the potential energy profile used in the case of low acceleration voltage.

In one example we consider a TOFIMS with a dual-stage linear extraction field ion source, a linear deceleration section of the reflectron, and a linear acceleration region before ion detection (FIG. 6). We have chosen double-stage extraction scheme because it is much easier to tune the potential $GV_0$ on the middle acceleration grid than to fit geometrical parameters of the system to get optimum operation. The case $\bar{t}=\bar{t}_0$ is considered as the most practical.

In the case of linear variation of the potential energy function $U_a(x)$ from $U_1$ to $U_2$ on the interval $\Delta x_a=x_2-x_1$ the integral (7) can be directly calculated:

$$I'_a = \frac{\Delta x_V V'}{\pi\Delta\overline{U}_a}\left[F\left(\frac{\overline{V}}{\overline{U}_2}\right) - F\left(\frac{\overline{V}}{\overline{U}_1}\right)\right] \tag{21}$$

where $\overline{U}_i=(V_0-U_i)/V_0$ (i=1 or 2), $\Delta\overline{U}_a=\overline{U}_2-\overline{U}_1$, and $$F(u) = \frac{1}{u}\arctan\sqrt{u} - \frac{1}{\sqrt{u}} + \arctan\sqrt{u} \tag{22}$$

Figure 7:
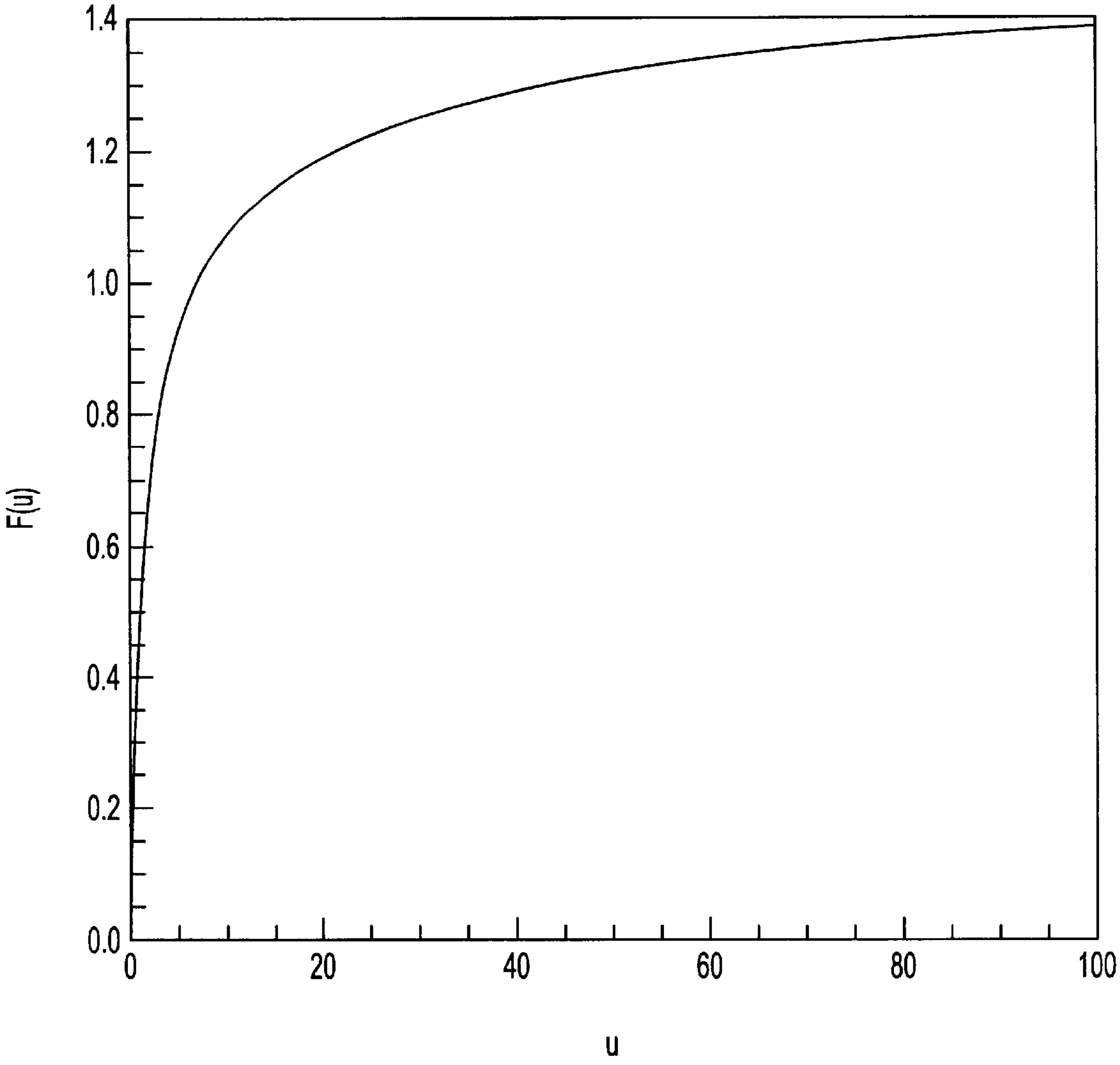
FIG. 7 illustrates the function F(u) determined by the equation (22).

The dependence F(u) is shown in FIG. 7. In the case of field-free region one can obtain for the integral (7):

$$I'_a = \frac{\Delta x_a}{\pi}\left[\arctan\sqrt{\frac{\overline{V}}{\overline{U}_a}} - \sqrt{\frac{\overline{V}}{\overline{U}_a}}\right] \tag{23}$$

Using the expressions (21) and (23) in the solution (6) for the case shown in FIG. 6 one can obtain:

$$\begin{aligned}\Delta x_V = &\left[\frac{s_1}{2(1-G)} + h\right]\overline{V} - \left[\frac{s_2}{G} + 2h - \frac{V_0 d}{U_D}\right]\frac{\overline{V}}{\pi}F(\overline{V}) - \\ &\left[\frac{s_1}{1-G} + \frac{s_2}{G}\right]\frac{\overline{V}}{\pi}F\left(\frac{\overline{V}}{1-G}\right) - \\ &\frac{V_0 d}{U_D}\frac{\overline{V}}{\pi}F\left(\frac{\overline{V}}{1+U_D/V_0}\right) - \frac{L}{\pi}\left[\arctan\sqrt{\overline{V}} - \sqrt{\overline{V}}\right]\end{aligned} \tag{24}$$

where $L=1_1+1_2$; $1_1$ and $1_2$ are the lengths of the field-free paths in the upstream and downstream regions respectively; $s_1$ and $s_2$ are the extraction and acceleration interval lengths in the ion source; h is the length of the deceleration region of the reflectron; d is the length of the acceleration region before ion detection (see FIG. 6 for geometry definitions); $U_D$ is the acceleration potential before ion detection.

Figure 8:
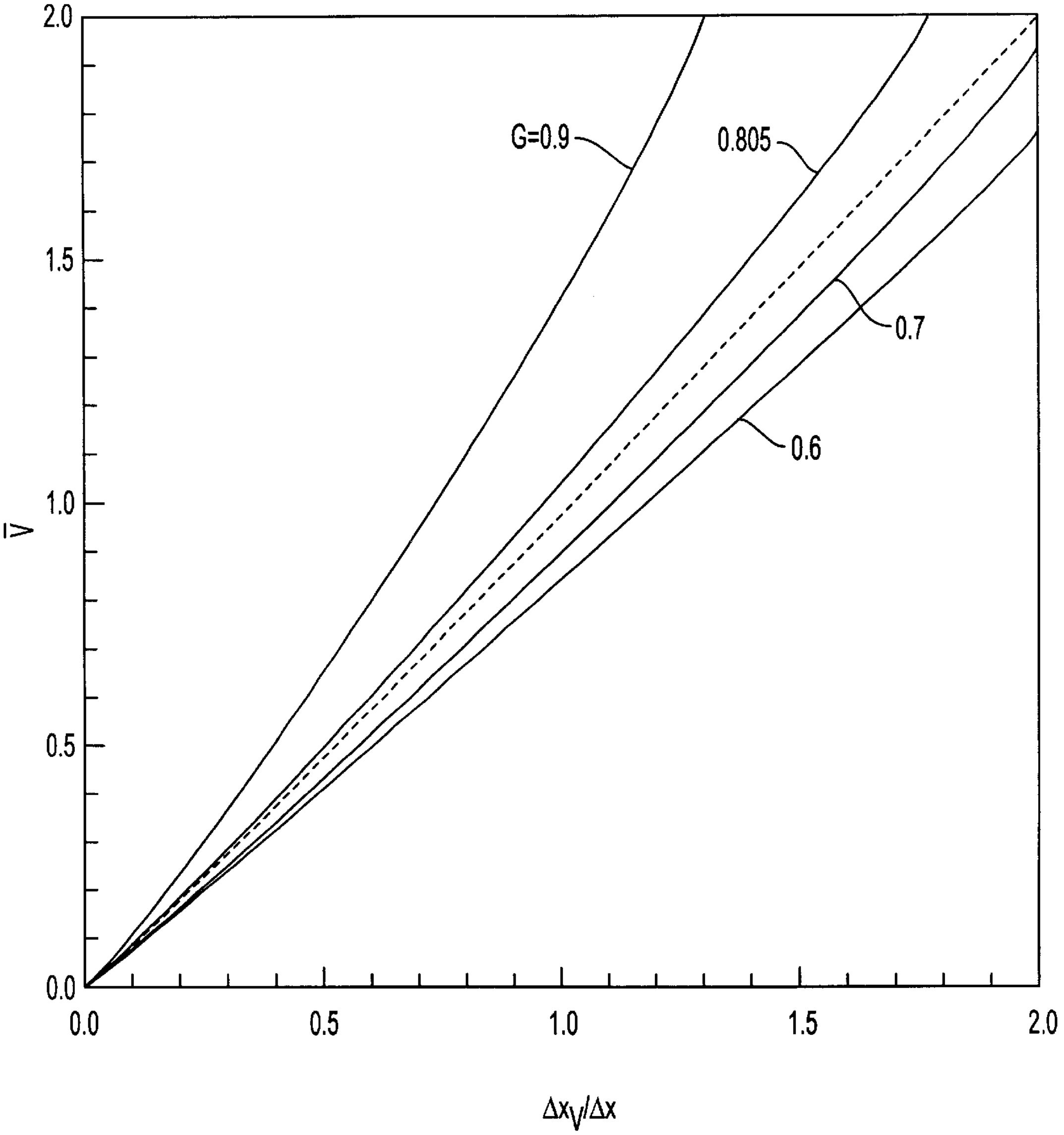
FIG. 8 illustrates the ideal velocity focusing potential in the correcting section of the reflectron for the special case of the potential distribution shown in FIG. 6 and the different values of the parameter G.

Calculations have been performed for a small size TOF/MS that is typical for a low acceleration voltage instrument: L=30 cm, $s_1=s_2=1$ cm, h=2.5 cm, d=1 cm, $U_D/V_0=50$. The ideal velocity focusing potential profiles in the second correcting section of the reflectron against the coordinate variable of $\Delta x_V/\Delta x$ where $\Delta x=h+s_1/2(1-G)$ are shown in FIG. 8 for different values of G. Note that in comparison with the linear field case of Short and Vestel where the ion velocity can be focused only for some specially tuned geometrical parameters in our case there is always a curved field solution for any parameter G. In the coordinates of FIG. 4 the slope of the potential curves near $\Delta x_V/\Delta x=0$ is not dependent of the parameter G and is equal to that of the dashed line shown in FIG. 8.

Special case of the correcting field close to linear field. One can see that the curvature of the reflectron correction field in FIG. 8 is determined by the geometrical properties of TOF/MS, in this case by the parameter G which determines the extraction and acceleration fields in the double-stage ion source. Of course, it is possible to adjust the geometrical factor G to obtain the correction field in the reflectron as close to linear one as possible. The more linear solution for the correction section of the reflectron the easier to implement it in practice. To achieve this goal it is required to make the expansion terms of power higher than unity in the formula (20) equal to zero. In our case we have just one parameter G to adjust and, thus, we will need to zero the term containing $\overline{V}^{3/2}$ only. Using the expression (24) for $\Delta x_V$ one can obtain the expansion coefficient A in the formula (20):

$$A = \frac{2}{3\pi}\left[\frac{L}{2} - \frac{s_2}{G} - 2h + \frac{V_0 d}{U_D} - \frac{1}{\sqrt{1-G}}\left(\frac{s_1}{1-G} - \frac{s_2}{G}\right) - \frac{1}{\sqrt{1+U_D/V_0}}\frac{V_0 d}{U_D}\right] \tag{25}$$

Figure 9:
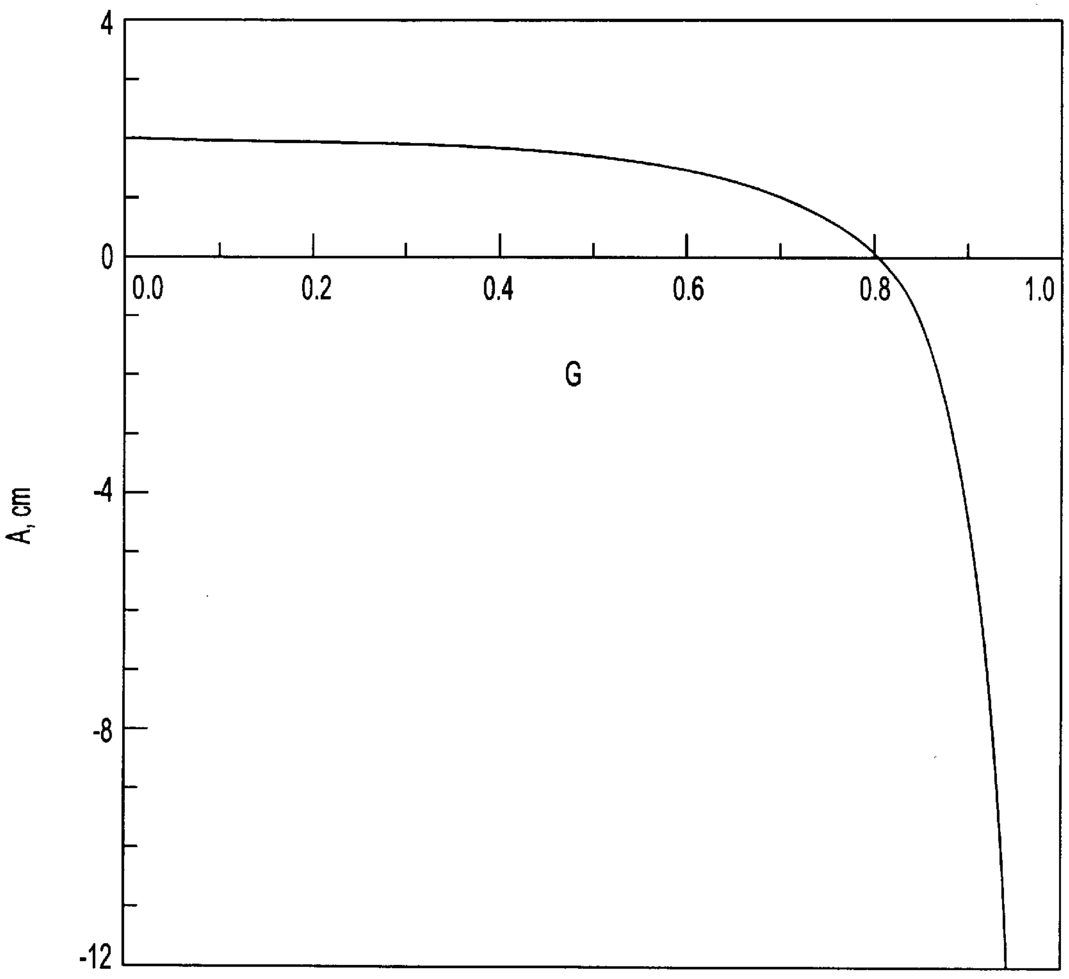
FIG. 9 illustrates the dependence of the expansion parameter A in the formula (20) upon the parameter G of the ion source extraction region for the special case of the potential distribution shown in FIG. 6.

The dependence of A upon the factor G is shown in FIG. 9. One can see that A is equal to zero at G≈0.805. For this G the potential inside the correction section of the reflectron shown in FIG. 8 is really very close to the line in the interval $0<\Delta x_V/\Delta x<0.4$ at least. This means that the linear field in the correcting section of the reflectron can effectively focus ions with the initial kinetic energy up to 40% of the acceleration potential $V_0$. According to FIG. 8 this interval is much smaller if $G \neq 0.805$. Thus, using our method one can choose the geometry, also referred to as electric field distribution, of a TOF/MS to achieve a more linear potential in the correcting section of the reflectron. In the case considered one parameter was adjusted to vanish the coefficient A in the expansion formula (20). It is clear that by diminishing the next term coefficient B in the formula (20) one can get even more linear potential inside the correcting section of the reflectron. This may take place if additional parameters in TOF/MS are allowed to tune. These parameters may arise if, for example, additional stages in the ion source or the reflectron are taken into consideration.

From the above, it can be seen that the potential (6) inside the reflectron can perform ideal focusing of the ion velocity in a reflectron TOF/MS. Note that the general solution (6) for the correcting reflectron field exists for arbitrary geometry and potential fields in an upstream and downstream region and in a decelerating section of the reflectron of a reflectron TOF/MS. This is because the potential field inside the reflectron is not linear and, thus, is effectively described by the infinite number of parameters. However, the curvature of the correcting potential field depends on the geometry of the accelerating fields in the ion source as well as in the post acceleration region before ion detection. This fact can be used for minimizing the potential distribution curvature to make building the reflectron easier. MALDI-TOF/MS is seen as the primary field for the application of the method because the initial velocity distribution of MALDI ions is the major limiting factor in achieving high mass resolution. Simple working formulae has been obtained for the most practical case of a TOF instrument with the two-stage ion source/two-stage reflectron. Similar formulae for designing a reflectron TOF/MS can be easily obtained for any other cases.

Thus, while the invention has been described by way of certain illustrated embodiments, it is understood that the words which have been used herein are words of description, rather than words of limitation. Changes may be made, within the purview of the appended claims, without departing from the scope and the spirit of the invention in its broader aspects. Although the invention has been described herein with reference to particular steps, materials, and embodiments, it is understood that the invention is not limited to the particulars disclosed. The invention extends to all equivalent steps, structures, materials, and uses.

We claim:

1. A time-of-flight mass spectrometer apparatus that allows for correction of an initial ion velocity distribution comprising:

an ion source where ions are formed, each ion having an initial kinetic energy;

an upstream ion flight region;

a downstream ion flight region;

a reflectron for reflecting ions from the upstream ion flight region into the downstream ion flight region, the reflectron including:

a first section to which a predetermined electric potential profile is applied for deceleration of the ions entering the reflectron from the upstream region down to about the initial kinetic energy, and a second section to which a curved electric potential profile is applied for reflecting ions back to the first section of the reflectron, the curved electric potential profile being dependent upon an electric potential profile in each of the upstream ion flight region, the first section of the reflectron, and the downstream ion flight region; and an ion detector for detecting ions as a function of time.

2. An apparatus according to claim 1 wherein:

the upstream ion flight region includes at least a first drift region having one of an accelerating and decelerating electric potential profile or a first electric field-free drift region; and the downstream ion flight region includes at least a second drift region having one of an accelerating and decelerating electric potential profile or a second electric field-free drift region.

3. An apparatus according to claim 2 wherein the curved electric potential profile is determined according to the equation:

$$\Delta x_V = \frac{(\bar{t} - \bar{t}_0) V_0^{1/2}}{\pi} \bar{V}^{1/2} - I'_u - I'_d - 2I'_r$$

where $$I'_a = \frac{1}{\pi} \int_{x_a}^{x_A} dx \left[ \arctan\sqrt{\frac{\bar{V}}{\bar{U}_a(x)}} - \sqrt{\frac{\bar{V}}{\bar{U}_a(x)}} \right];$$

and where $$\bar{t}_0 = \int_{x_S}^{x_r} \frac{dx}{\sqrt{V_0 - U_u(x)}} + \int_{x_D}^{x_r} \frac{dx}{\sqrt{V_0 - U_d(x)}} + 2\int_{x_r}^{x_R} \frac{dx}{\sqrt{V_0 - U_r(x)}};$$

and where $$\bar{t} \geqq \bar{t}_0;$$

and where $$\bar{V} = (V - V_0)/V_0;$$

and where $V_0$ is the lower limit on the range of ion initial energies; and where $V$ is the upper limit on the range of ion initial energies; and where $$\bar{U}_a(x) = [V_0 - U_a(x)]/V_0;$$

and where $$a = u, d, \text{ or } r;$$

and where $U_u(x)$ is the ion potential energy due to the electric field in the upstream region;

and where $U_d(x)$ is the ion potential energy due to the electric field in the dowbstream region;

and where $U_r(x)$ is the ion potential energy inside the reflectron.

4. An apparatus according to claim 2, wherein one or more of the first drift regions are identical to one or more of the second drift regions.

5. An apparatus according to claim 2, wherein one or more first drift regions have essentially linear profiles of electric potential.

6. An apparatus according to claim 2, wherein one or more second drift regions have essentially linear profiles of electric potential.

7. An apparatus according to claim 2, wherein electric potential profiles in one or more of the first drift region, the second drift region and the first section of the reflectron are adjusted to make the electric potential profile of the second section of the reflectron close to linear potential.

8. An apparatus according to claim 7, wherein only the electric potentials in one or more profiles are adjusted.

9. An apparatus according to claim 7, wherein the electric potentials and a length of one or more profile regions are adjusted.

10. An apparatus according to claim 1, wherein the electric potential in the upstream ion flight region, the reflectron, and the downstream ion flight region has essentially axial symmetry.

11. An apparatus according to claim 1, wherein the first section of the reflectron has essentially a linear profile of electric potential.

12. An apparatus according to claim 1, wherein the potential of the electric field at a beginning of the upstream region is equal to the electric potential at the beginning of the second section of the reflectron.

13. An apparatus according to claim 1, wherein the potential of the electric field at the beginning of the upstream region is less than the electric potential at the beginning of the second sections of the reflectron.

14. An apparatus according to claim 1, wherein a grid is located at the place of mechanical connection of the first and second sections of the reflectron.

15. An apparatus according to claim 1, wherein no grid is located at the place of mechanical connection of the first and second sections of the reflectron.

16. An apparatus according to claim 1, wherein a laser pulse is used for formation of ions in the ion source.

17. An apparatus according to claim 1, wherein a matrix-assisted laser desorption/ionization method is used for formation of ions in the ion source.

18. A method of detecting ions as a function of time comprising the steps of introducing ions into an upstream ion flight region from an ion source, each of the introduced ions having an initial kinetic energy;

reflecting ions from the upstream ion flight region into a downstream ion flight region using a reflectron, the step of reflecting including the steps of:

applying a first electric potential profile to a first section of the reflectron to decelerate the ions entering the reflectron from the upstream region down to about the initial kinetic energy; and applying a curved electric potential profile to a second section of the reflectron to reflect ions back to the first section of the reflectron, the curved electric potential profile being dependent upon an electric potential profile in each of the upstream ion flight region, the first section of the reflectron, and the downstream ion flight region; and detecting ions from the downstream ion flight region as a function of time.

19. A method according to claim 18 wherein the upstream ion flight region includes at least a first drift region having one of an accelerating and decelerating electric potential profile or a first electric field-free drift region; and the downstream ion flight region includes at least a second drift region having one of an accelerating and decelerating electric potential profile or a second electric field-free drift region.

20. A method according to claim 19 wherein the step of applying the curved electric potential profile determines the curved electric potential profile according to the equation:

$$\Delta x_V = \frac{(\bar{t} - \bar{t}_0)V_0^{1/2}}{\pi}\bar{V}^{1/2} - I_u' - I_d' - 2I_r'$$

where $$I_a' = \frac{1}{\pi}\int_{x_a}^{x_A} dx\left[\arctan\sqrt{\frac{\bar{V}}{\bar{U}_a(x)}} - \sqrt{\frac{\bar{V}}{\bar{U}_a(x)}}\right];$$

and where $$\bar{t}_0 = \int_{x_S}^{x_r} \frac{dx}{\sqrt{V_0 - U_u(x)}} + \int_{x_D}^{x_r} \frac{dx}{\sqrt{V_0 - U_d(x)}} + 2\int_{x_r}^{x_R} \frac{dx}{\sqrt{V_0 - U_r(x)}};$$

and where $$\bar{t} \geqq \bar{t}_0;$$

and where $$\bar{V} = (V - V_0)/V_0;$$

and where $V_0$ is the lower limit on the range of ion initial energies; and where V is the upper limit on the range of ion initial energies; and where $$\bar{U}_a(x) = [V_0 - U_a(x)]/V_0;$$

and where $$a = u,\ d,\ \text{or}\ r;$$

and where $U_u(x)$ is the potential energy due to the electric field in the upstream region;

and where $U_d(x)$ is the ion potential energy due to the electric field in the downstream region;

and where $U_r(x)$ is the ion potential energy inside the reflectron.

21. A method according to claim 18, wherein the electric potential in the upstream ion flight region, the reflectron, and the downstream ion flight region has essentially axial symmetry.

* * * * *